(12) United States Patent
Lee et al.

(10) Patent No.: US 8,469,246 B2
(45) Date of Patent: Jun. 25, 2013

(54) CUP HOLDER FOR VEHICLE

(75) Inventors: Young Ju Lee, Suwon-si (KR); Cheol Soo Choi, Hwaseong-si (KE); Dong-Jin Park, Daegu (KR)

(73) Assignees: Kia Motors Corporation, Seoul (KR); Ecoplastic Corporation, Gyeongju-Si (KR)

( * ) Notice: Subject to any disclaimer, the term of this patent is extended or adjusted under 35 U.S.C. 154(b) by 427 days.

(21) Appl. No.: 12/938,127

(22) Filed: Nov. 2, 2010

(65) Prior Publication Data

US 2011/0315730 A1   Dec. 29, 2011

(30) Foreign Application Priority Data

Jun. 28, 2010   (KR) .................. 10-2010-0061457

(51) Int. Cl.
*B60N 3/10*   (2006.01)
(52) U.S. Cl.
USPC ......................................... 224/282; 224/926
(58) Field of Classification Search
USPC ....... 224/282, 548, 553, 567, 926; 248/311.2; 220/737
See application file for complete search history.

(56) References Cited

U.S. PATENT DOCUMENTS

| | | | |
|---|---|---|---|
| 5,170,980 A | 12/1992 | Burrows et al. | |
| 6,843,397 B2 * | 1/2005 | Then et al. | 224/552 |
| 2005/0001127 A1 | 1/2005 | Schaal | |

FOREIGN PATENT DOCUMENTS

| | | |
|---|---|---|
| JP | 8-142731 A | 6/1996 |
| JP | 9-104278 A | 4/1997 |
| JP | 9-226436 A | 9/1997 |
| JP | 2001-301513 A | 10/2001 |
| JP | 2002-104052 A | 4/2002 |
| JP | 2005-22645 A | 1/2005 |
| JP | 2005-47438 A | 2/2005 |
| JP | 2005-112330 A | 4/2005 |
| KR | 1998-024647 U | 7/1998 |
| KR | 10-0642550 B1 | 11/2006 |

* cited by examiner

*Primary Examiner* — Justin Larson
(74) *Attorney, Agent, or Firm* — Morgan, Lewis & Bockius LLP

(57) ABSTRACT

A cup holder apparatus for a vehicle may include an accommodating tray provided inside a vehicle compartment and having an accommodation space for accommodating a cup therein, a cup support member rotatably provided around a rotating shaft (Z axis) against the accommodating tray and including a bottom portion for safe-placing the cup in the accommodation space and a support portion formed in a stand from the bottom portion to support an outer periphery of the cup, and a release prevention member prepared separately from the cup support member and connected to the bottom portion of the cup support member, while being rotatably coupled to the accommodating tray, to prevent release of the cup support member from the accommodating tray, wherein the release of the release prevention member from the accommodating tray is hindered by an upper stopper formed on the accommodating tray while the cup support member is rotatably coupled to the upper stopper and is rotated around the rotating shaft.

18 Claims, 12 Drawing Sheets ial space formed on an upper portion thereof to accommodate a cup; a cup support member rotatably installed in the accommodating space of the accommodating tray and having a first ring portion formed on an outer circumference thereof; a release prevention member having a second ring portion formed on an outer circumference thereof to be engaged with the first ring portion to prevent the cup support member from seceding from the accommodating tray in an axial direction of the cup support member; and a lock release unit installed between the cup support member and the accommodating tray and locking or releasing the cup support member at a use position to support the cup and at a storage position where the cup support member is not used.

CUP HOLDER FOR VEHICLE

CROSS-REFERENCE TO RELATED APPLICATION

The present application claims priority to Korean Patent Application No. 10-2010-0061457, filed on Jun. 28, 2010 in the Korean Intellectual Property Office, the entire contents of which is incorporated herein for all purposes by this reference.

BACKGROUND OF THE PRESENT INVENTION

1. Field of the Present Invention

The present invention relates to a cup holder for a vehicle, and more particularly, to a cup holder for a vehicle, which can maximally prevent upward, downward, right, and left movement of a cup support member.

2. Description of the Prior Art

Generally, a cup holder which can receive and support a beverage can, a cup, or the like (which is commonly called a cup) is provided in a vehicle, and accommodate the cup if necessary after a user drinks a beverage.

Such a cup holder is provided to prevent a cup from falling down or shaking while driving, and is formed on a crash pad or a console box, or attached to a predetermined region of the vehicle.

As the simplest structure, a cup holder in the related art has a structure in which a groove for simply accommodating the cup is formed on an upper surface of a crash pad or a console box. This cup holder, however, is unable to accommodate all cups having diverse sizes and is also unable to support the cup properly.

That is, since the groove is formed in a console box with an equal size, the size of the cup that can be accommodated is fixed. In particular, if the size of the cup does not coincide with the size of the groove, the cup may secede from the groove or fall down while driving, and in this case, the beverage flows out of the cup to get the inside of the vehicle dirty and to cause an accident during driving.

Accordingly, in order to support a cup more stably, U.S. Patent Application Publication No. 2005/0001127 and U.S. Pat. No. 5,170,980 disclose constructions in which a rotatable cup support member is installed in a groove where a cup is received.

In particular, U.S. Patent Application Publication No. 2005/0001127 discloses a cup holder including a cup support member which is rotated around the Z axis to divide off a reception region and includes a wall passing around approximately 180° and a rotary dish, a torsion spring for rotating the cup support member, and a diameter-compensating flap which is rotated by manipulation of a button and releases the locking state of the cup support member.

If a user presses the button downward, the diameter-compensating flap is rotated in association with the pressed button to release the locking state of the cup support member, and as a result, the cup support member is rotated counterclockwise to be in a cup supportable state.

In this case, a guide portion which guides the cup support member when the cup support member is rotated against an accommodating tray is illustrated in FIG. 1. That is, on a bottom surface of the accommodating tray 110, a pair of first guide ribs 132 are partially formed in opposite positions, and on a bottom surface of the cup support member 140, a pair of assembly holes 115, into which the first guide ribs 132 are inserted to be assembled, are formed in positions that correspond to the first guide ribs 132. Between the pair of assembly holes 115, a second guide rib 143 is formed to be guided along the first guide ribs 132.

An engaged structure of the first guide ribs 132 and the second guide rib 143 is as illustrated in FIG. 2. That is, the second guide rib 143, which is integrally formed on a bottom surface of the cup support member 140 in "L"-shape in cross section along the circumferential direction thereof, is insertion-engaged with the first guide ribs 132 through the assembly holes 115 formed in the accommodating tray 110. Accordingly, the cup support member 140 can be rotated against the accommodating tray 110 in a state where the upward, downward, right, and left movement of the second guide rib 143 is hindered by the first guide ribs 132.

However, in the above-described cup holder in the related art, the second guide rib 143 has a structure that is rotated in a body with the cup support member 140, and thus if the cup support member 140 is rotated over a predetermined angle, the second guide rib 143 secedes from the first guide rib 132. Accordingly, the cup support member 140 is concerned to move against the accommodating tray 110, and thus the rotating angle of the cup support member 140 should be limited (to about 95°.

Also, if the size of the accommodating tray 110 becomes too large to cause the dimensional inferiority of the first guide ribs 132, the first guide rib 132 and the second guide rib 143 are not normally engaged with each other, and thus it becomes difficult to hinder the movement of the cup support member 140.

On the other hand, in the mechanism where the cup support member 140 is lock-released from the accommodating tray 110, if a user presses the button 170, the diameter-compensating flap 105, which is locked with the cup support member 140, is rotated, and as a result, a pin provided on the cup support member 140 secedes from the groove formed in the diameter-compensating flap 105 to rotate the cup support member 140 to a use position (a position for supporting the cup).

However, since the cup holder in the related art has a structure in which the diameter-compensating flap is associated with the button 170, the position of the diameter-compensating flap should be changed in order to change the position of the button 170, and thus the design degree of freedom deteriorates.

The information disclosed in this Background of the present invention section is only for enhancement of understanding of the general background of the present invention and should not be taken as an acknowledgement or any form of suggestion that this information forms the prior art already known to a person skilled in the art.

SUMMARY OF THE PRESENT INVENTION

Various aspects of the present invention are directed to provide a cup holder for a vehicle, which can maximally prevent the movement of a cup support member when the cup support member may be rotated by installing a release prevention member that may be not rotated in a body with the cup support member, and thus has no limit in rotation amount of the cup support member, and to provide a cup holder, which can freely change the position of a button for releasing the locking state between the cup support member and an accommodating tray, and thus has an improved design degree of freedom.

In one aspect of the present invention, a cup holder apparatus for a vehicle may include an accommodating tray provided inside a vehicle compartment and having an accommodation space for accommodating a cup therein, a cup support member rotatably provided around a rotating shaft (Z axis) against the accommodating tray and including a bottom portion for safe-placing the cup in the accommodation space and a support portion formed in a stand from the bottom portion to support an outer periphery of the cup, and a release prevention member prepared separately from the cup support member and connected to the bottom portion of the cup support member, while being rotatably coupled to the accommodating tray, to prevent release of the cup support member from the accommodating tray, wherein the release of the release prevention member from the accommodating tray may be hindered by an upper stopper formed on the accommodating tray while the cup support member may be rotatably coupled to the upper stopper and may be rotated around the rotating shaft.

The accommodating tray may include a retaining portion to which the support portion of the cup support member may be selectively received.

The cup holder apparatus may further include a left stopper and a right stopper formed in a tray main body of the accommodating tray, wherein the release prevention member may be positioned between the upper stopper and the left/right stopper, wherein the accommodating tray comprises: the tray main body having a bottom surface on which the left and right stoppers may be formed, and an upper cover which may be integrally fixed to an upper portion of the tray main body and on which the upper stopper may be formed.

The left and right stoppers may form a recessed portion on the bottom surface of the tray main body to open an upper side of the tray main body such that the release prevention member may be rotatably disposed in the recessed portion, and the upper stopper may be a bottom surface of the upper cover, wherein the release prevention member comprises: a release prevention main body positioned in the recessed portion in a state where the release prevention main body may be in close contact with the bottom surface of the upper cover, and a rotating shaft insertion main body which may be formed to project upwards from the release prevention main body and into which a shaft support portion protruding from the bottom portion of the cup support member may be inserted.

The outer diameter of the release prevention main body may be larger than the inner diameter of the upper stopper and the rotating shaft may connect the release prevention main body and the shaft support portion by passing the release prevention main body and the shaft support portion together, and wherein the rotating shaft slidably supports the release prevention main body against the bottom surface of the tray main body.

A guide may be formed to project in one direction from the bottom surface of the bottom portion along a circumferential direction thereof, and a rail, which rotatably guides the guide while the cup support member is rotated, may be formed to project in the other direction from the upper surface of the upper cover.

The cup holder apparatus may further include a locking unit having a locking projection formed to project downwards from an outer circumference surface of the support portion, and a button member which may be elastically supported to be pressed on one side of the accommodating tray and on which a hook to selectively lock the locking projection may be formed thereto.

The cup holder apparatus may further include an elastic member having one end fixed to the accommodating tray and the other end fixed to the bottom portion of the cup support member to apply an elastic force to the cup support member in a direction in which the cup support member may be lock-released from the locking unit, wherein when a user presses the button member, the hook may be lock-released from the locking projection and thus the cup support member may be rotated around the rotating shaft to be shifted to a cup supportable state by the elastic force of the elastic member such that the support portion of the cup support member may be released from the retaining portion of the accommodating tray to form the accommodating space for accommodating the cup therein, wherein a gear may be formed along a circumferential direction on the bottom surface of the bottom portion with a predetermined diameter along the rotating shaft, and wherein a rotating damper may be installed in the accommodating tray and engaged with the gear of the bottom portion while the cup support member may be rotated around the rotating shaft by the elastic member.

The rotating damper may include a gear engaged with the gear of the bottom portion, wherein the rotating damper may be an elastic member.

The button member may include a knob including the hook, a mounting bracket attached to the accommodating tray and slidably receiving the knob therein, wherein the mounting bracket includes an exposing hole formed along a longitudinal direction of the mounting bracket and the hook of the knob projects toward the locking projection of the support portion through the exposing hole, and a compression spring installed inside the mounting bracket to elastically support the knob in an upward direction, wherein the button member may be installed in the accommodating tray by changing the position thereof regardless of the rotating direction of the cup support member.

In another aspect of the present invention, the cup holder apparatus for a vehicle, may include an accommodating tray provided inside a vehicle compartment and having an accommodation space for accommodating a cup, a cup support member rotatably provided around a rotating shaft (Z axis) against the accommodating tray and including a bottom portion for safe-placing the cup and a support portion formed in a stand from the bottom portion to support an outer periphery of the cup, a release prevention member prepared separately from the cup support member and connected to the bottom portion of the cup support member, while being rotatably coupled to the accommodating tray, to prevent release of the cup support member from the accommodating tray, a locking unit including a locking projection formed to project downwards from an outer circumference surface of the support portion, and a button member which may be elastically supported to be pressed on one side of the accommodating tray and on which a hook to selectively lock the locking projection may be formed thereto, and an elastic member having one end fixed to the accommodating tray and the other end fixed to the bottom portion of the cup support member to apply an elastic force to the cup support member in a direction in which the cup support member may be lock-released from the locking unit, wherein the button member may be installed in the accommodating tray by changing the position thereof regardless of the rotating direction of the cup support member.

The release prevention member may include a release prevention main body positioned between an upper stopper formed in the accommodating tray and right and left stoppers, and a rotating shaft insertion main body which may be formed to project upward from the release prevention main body and into which the rotating shaft, having passed through the release prevention main body, may be inserted.

With the above-described construction, since the release prevention member may be separately prepared and connected to the cup support member, the movement of the cup support member may be maximally hindered even if the rotation amount of the cup support member against the accommodating tray may be great.

Also, since the position of the button member for releasing the locking between the cup support member and the accommodating tray may be changed regardless of the rotating direction, the design degree of freedom can be improved.

Another subject to be achieved by the present invention may be to provide a cup holder, which can freely change the position of a button for releasing the locking state between the cup support member and an accommodating tray, and thus has an improved design degree of freedom.

The methods and apparatuses of the present invention have other features and advantages which will be apparent from or are set forth in more detail in the accompanying drawings, which are incorporated herein, and the following Detailed Description of the present invention, which together serve to explain certain principles of the present invention.

Figure 1:
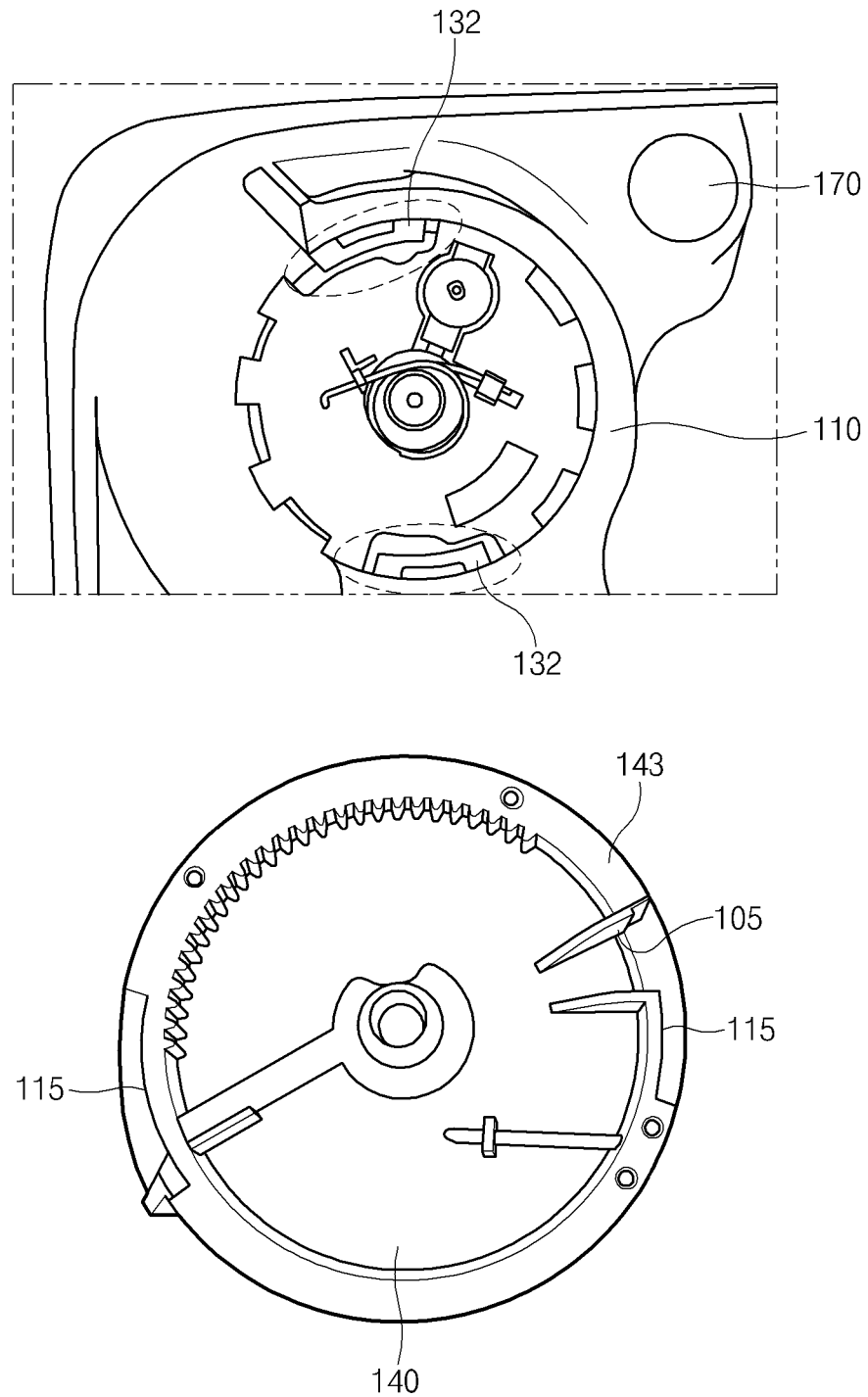
FIG. 1 is a perspective view illustrating an accommodation tray and a support of a cup holder in the related art.
Figure 2:
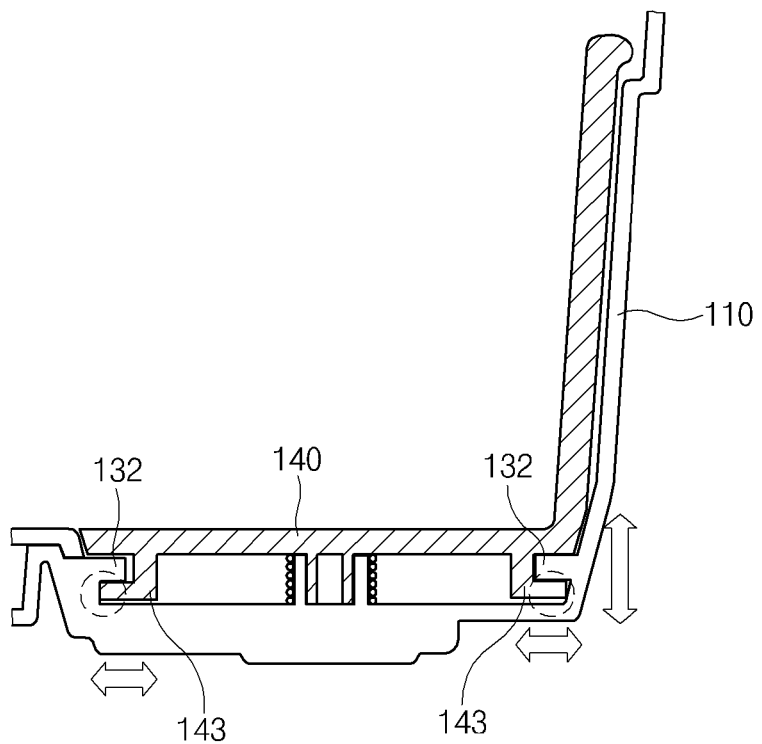
FIG. 2 is a sectional view illustrating a cup support member of FIG. 1 engaged with the accommodating tray.

It should be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments, it will be understood that present description is not intended to limit the present invention(s) to those exemplary embodiments. On the contrary, the present invention(s) is/are intended to cover not only the exemplary embodiments, but also various alternatives, modifications, equivalents and other embodiments, which may be included within the spirit and scope of the present invention as defined by the appended claims.

As illustrated in FIGS. 3 to 11, a cup holder according to a first embodiment of the present invention includes an accommodating tray 10 provided inside a vehicle compartment, a cup support member 40 rotatably provided around a rotating shaft (Z axis) 35 against the accommodating tray 10, and a release prevention member 50 connecting the accommodating tray 10 and the cup support member 40 to prevent upward, downward, right, and left movement of the cup support member 40.

The accommodating tray 10 has an accommodation space 10a for accommodating the cup, and includes a tray main body 20, and an upper cover 30 which is integrally fixed to an upper portion of the tray main body 20. In this case, the accommodating tray 10 may be a console box or a crash pad.

On a button surface of the tray main body 20, a recessed portion 20a having an open upper side is formed. By the recessed portion 20a, a lower stopper 21 and right/left stoppers 22 and 23 are formed.

Here, the lower stopper 21 serves to prevent the release prevention member 50 from moving downward, and the right/left stoppers 22 and 23 serve to prevent the release prevention member 50 from moving in right/left directions.

The upper cover 30 is prepared separately from the tray main body 20. The upper cover 30 is rotatably coupled to the bottom surface of a bottom portion 41 of the cup support member 40 to be described later by means of the rotating shaft 35, and integrally fixed to the upper portion of the tray main body 20.

On an upper surface of the upper cover 30, a rail 32, which guides a guide 43 to be described later when the cup support member 40 is rotated, is formed to project along the circumferential direction. Also, on the upper cover 30, a rotating damper 45 including a gear 46 is mounted to be rotated in engagement with a gear 44 to be described later when the cup support member 40 is rotated around rotating shaft (Z axis) 35 to reduce the speed of the cup support member 40 (illustrated in more detail than in FIGS. 9 and 10).

In an exemplary embodiment of the present invention, the rotating damper 45 is an elastic member.

The cup support member 40 includes the bottom portion 41 for safe placing of the cup and a support portion 42 formed in a stand from the bottom portion 41 to support the cup in close contact with an outer periphery of the cup.

Figure 9:
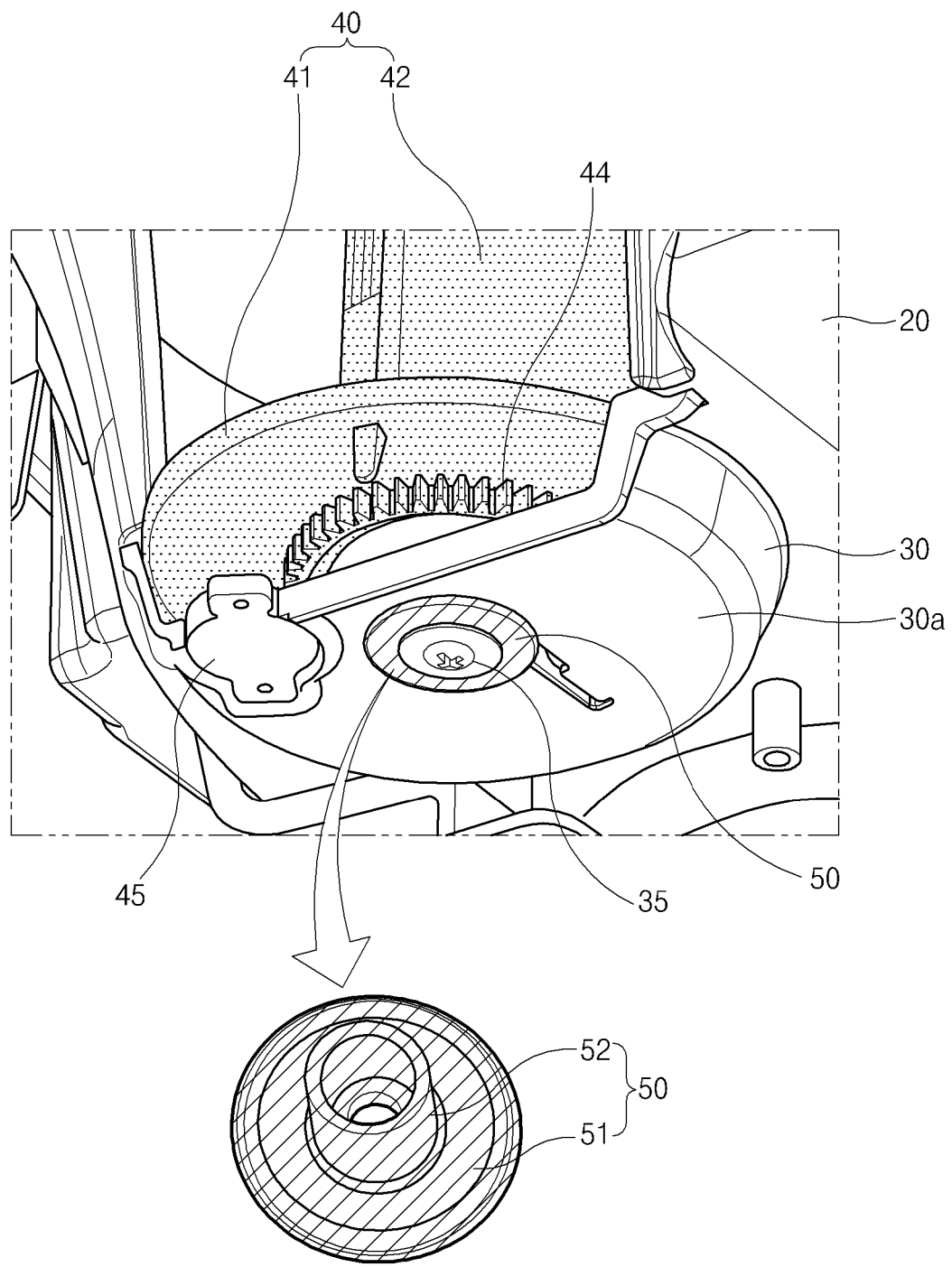
FIG. 9 is a view illustrating a state where a release prevention member is engaged with an upper cover in an exemplary cup holder according to the present invention, seen from the lowside.

The bottom portion 41 is in the form of a circle, and a shaft support portion 46 for supporting the rotating shaft 35, which is inserted into the shaft support portion 46, is formed to project downward from the bottom portion 41. Also, on the bottom surface of the bottom portion 41, which is apart for a predetermined distance from the shaft support portion 46, a guide 43 for being guided along the rail 32 when the cup support member 40 is rotated around the rotating shaft 35, is formed to project along the circumferential direction. Also, on the bottom surface of the button portion 41, the gear 44 that is engaged with a rotating damper 45 as shown in FIG. 9 is formed at a predetermined angle along the circumferential direction.

Here, between the bottom portion 41 and the upper cover 30, a torsion spring 80 having one end fixed to the upper cover 30 and the other end fixed to the bottom portion 41 is installed.

Figure 8:
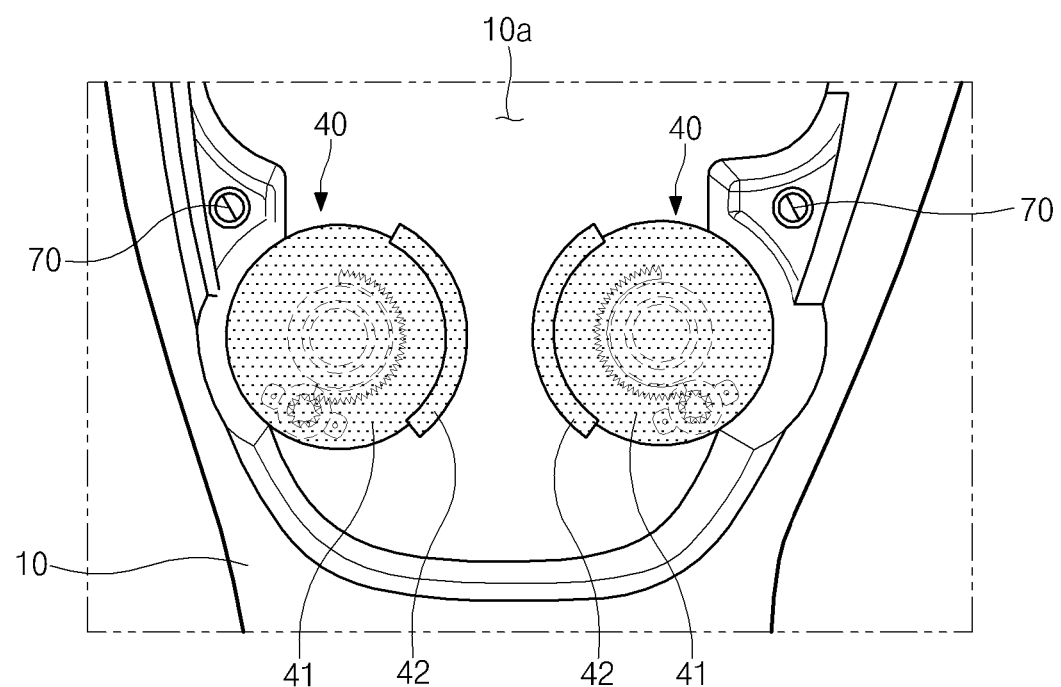
FIG. 8 is a view illustrating a state where a cup support member is rotated by about 170° by an operation as shown in FIGS. 5 to 7, seen from the upside.

The torsion spring 80 is positioned between the shaft support portion 46 and the guide 43, and is inserted into the circumference of the rotating shaft insertion main body 52 of the release prevention member 50 to be described later. In this case, the torsion spring 80 applies an elastic force to the cup support member 40 in a direction in which the cup support member 40 is lock-released from a locking unit 60 to be described later, and if the cup support member 40 is lock-released from the locking unit 60, the cup support member 40 is automatically rotated around the rotating shaft 35 by the elastic force of the torsion spring 80 to be in a state as shown in FIG. 8.

The support portion 42 is formed vertically from the bottom portion 41 at a predetermined angel enough to sufficiently support the cup. In this case, on the outer side surface of the support portion 42, a locking projection 65 that forms the locking unit 60 to be described later is formed to project.

The release prevention member 50 prevents the cup support member 40 from moving in upward, downward, right, and left directions when the cup support member 50 is rotated around the rotating shaft 35. Accordingly, the cup support member stably supports the cup, and thus the beverage in the cup is not spilled out of the cup.

Figure 10:
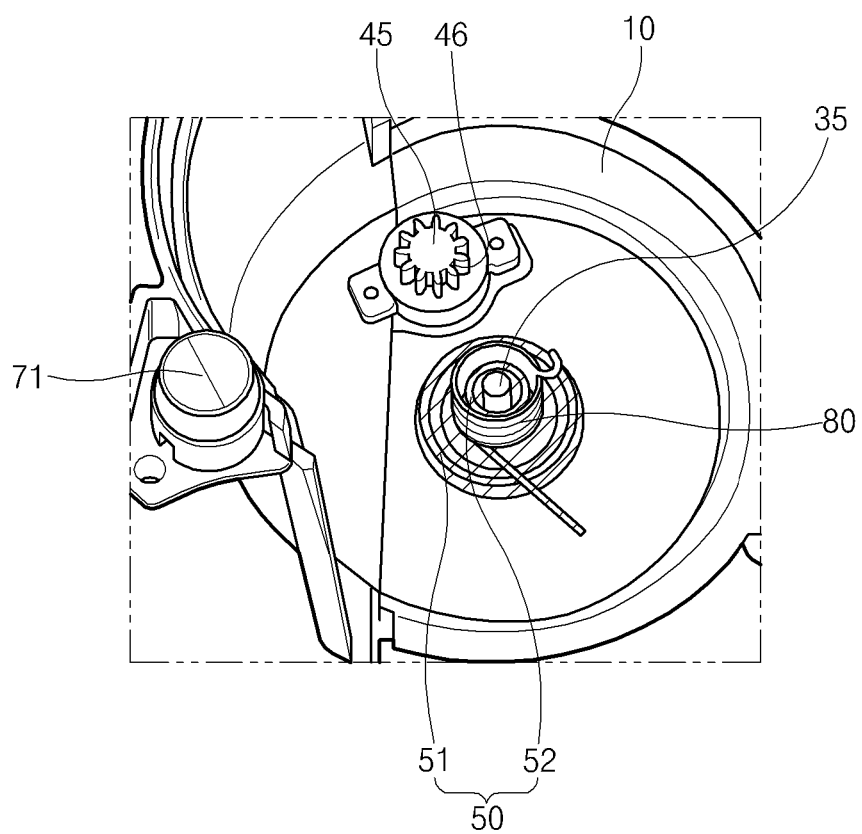
FIG. 10 is a perspective view illustrating a state where a cup support member is removed in FIG. 9, seen from the upside.
Figure 11:
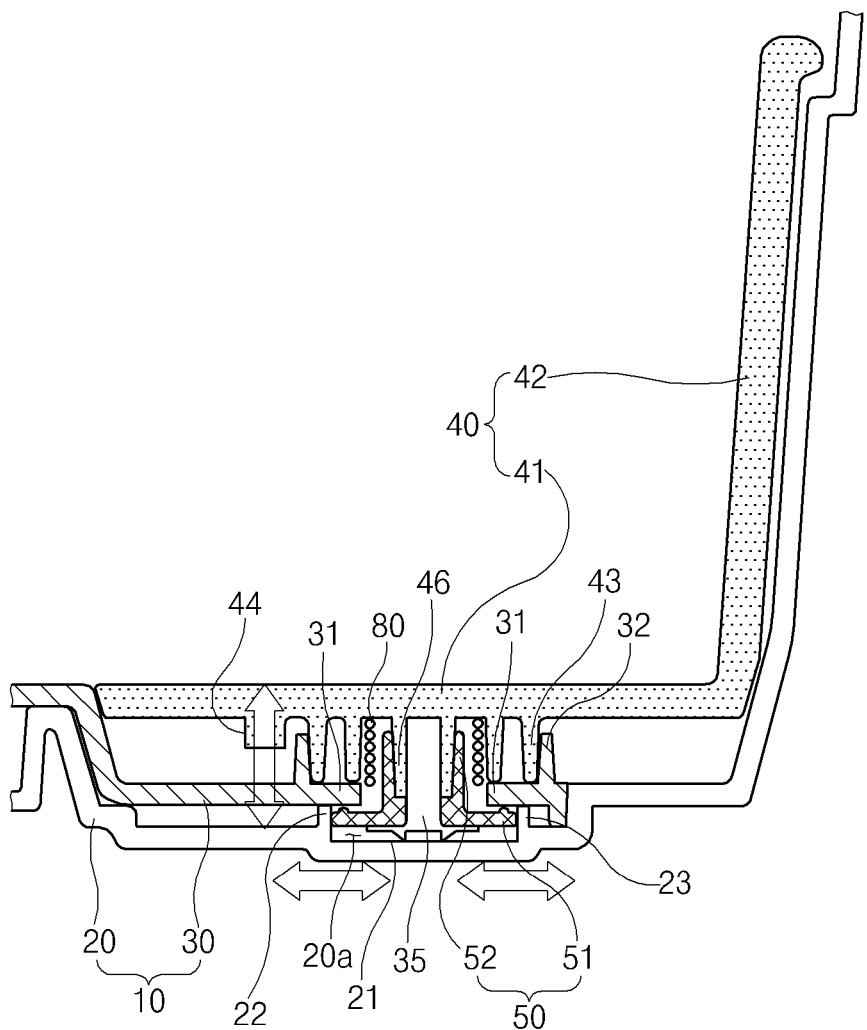
FIG. 11 is a section view taken along line X-X of FIG. 3.

Here, the release prevention member 50, as illustrated in FIGS. 9 to 11, includes a release prevention main body 51 positioned in the recessed portion 20a in a state where the release prevention member 50 is in close contact with the bottom surface 30a of the upper cover 30, and a rotating shaft insertion main body 52 which is formed to project upward from the release prevention main body 51 and into which the rotating shaft 35, having passed through the release prevention main body 51, is inserted.

In this case, the bottom surface 30a of the upper cover 30 actually performs the function of the upper stopper 31, and the recessed portion 20a having an open upper portion actually performs the function of the lower stopper 21 and the right/left stoppers 22 and 23.

Accordingly, the release prevention main body 51 is positioned between the lower stopper 21 and the right/left stoppers 22 and 23 formed on the tray main body 20 and the upper stopper 31 formed on the upper cover 30, and when the cup support member 40 is rotated around the rotating shaft 35, the movement of the release prevention main body 51 in upward, downward, right, and left directions is hindered, resulting in that the cup support member 40 that is connected to the release prevention main body 51 is prevented from being moved in upward, downward, right, and left directions.

Also, in the exemplary embodiment of the present invention, since the release prevention member 50 is prepared separately from the cup support member 40 and then is connected to the cup support member 40 through the upper stopper 31, the release prevention member 50 is not decupled from with the cup support member 40. Accordingly, even though the rotation amount of the cup support member 40 is large, the cup support member 40 does not secede from the release prevention member 50, and thus the rotation amount of the cup support member 40 is not limited. In other word, in the related art, if the cup support member 140 is rotated over about 95°, the second guide rib 143, which is guided along the first guide rib 132, secedes from the assembly hole 115, and thus the cup support member 140 moves in upward, downward, right, and left directions. By contrast, according to an exemplary embodiment of the present invention, even if the cup support member 40 is rotated over about 170°, the cup support member 40 is sufficiently supported by the release prevention member 50, and thus the movement of the cup support member 40 in upward, downward, right, and left directions can be prevented.

On the other hand, in the embodiment of the present invention, a locking unit 60 is provided so that the cup support member 40 is lock-maintained in or lock-released from the accommodating tray 10.

The locking unit 60 includes a locking projection 65 formed on the outer side surface of the support portion 42, and a button member 70 on which a hook 75 that is lock-maintained in or lock-released from the locking projection 65 is formed. The button member 70 is elastically supported on one side of the accommodating tray 10 to be pressed, and includes a knob 71 in which the hook 75 is formed to project toward the locking projection 65, a mounting bracket 72 in which the knob 71 is movably inserted in upward and downward directions and which mounts the knob 71 in the accommodating tray 10, and a compression spring 73 installed inside the mounting bracket 72 to elastically support the knob 71 in an upward direction. If a user presses the knob 71, the hook 75 is lock-released from the locking projection 65, and the cup support member 40 is rotated by the restoring force of the torsion spring 80 to be shifted to a supportable state. On the other hand, if the cup holder is not used, the cup support member 40 is manually rotated counterclockwise, and the locking projection 65 is lock-maintained in the hook 75.

In this case, on one side of the mounting bracket 72, an exposing hole 72a, which is cut so that the hook 75 does not interfere with the knob 71 when the knob 71 is moved in upward and downward directions, is formed.

With the above-described construction, the operation principle of the cup holder according to the first embodiment of the present invention will be described with reference to FIGS. 3, and 5 to 8.

Figure 3:
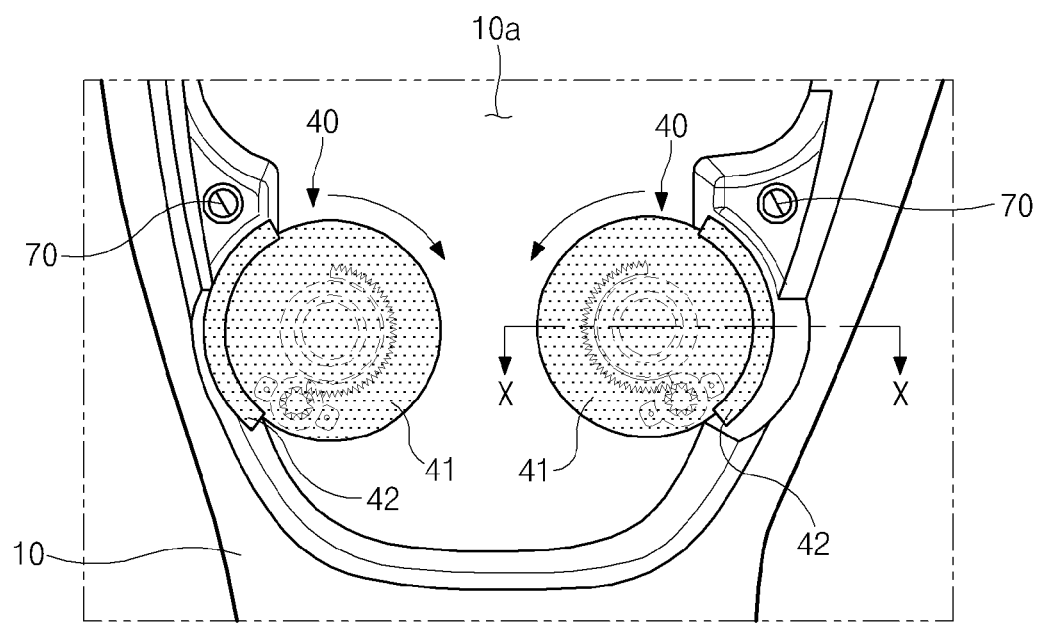
FIG. 3 is a view illustrating a state where a cup support member of an exemplary cup holder is lock-maintained by a locking unit according to the present invention, seen from the upside.
Figure 4:
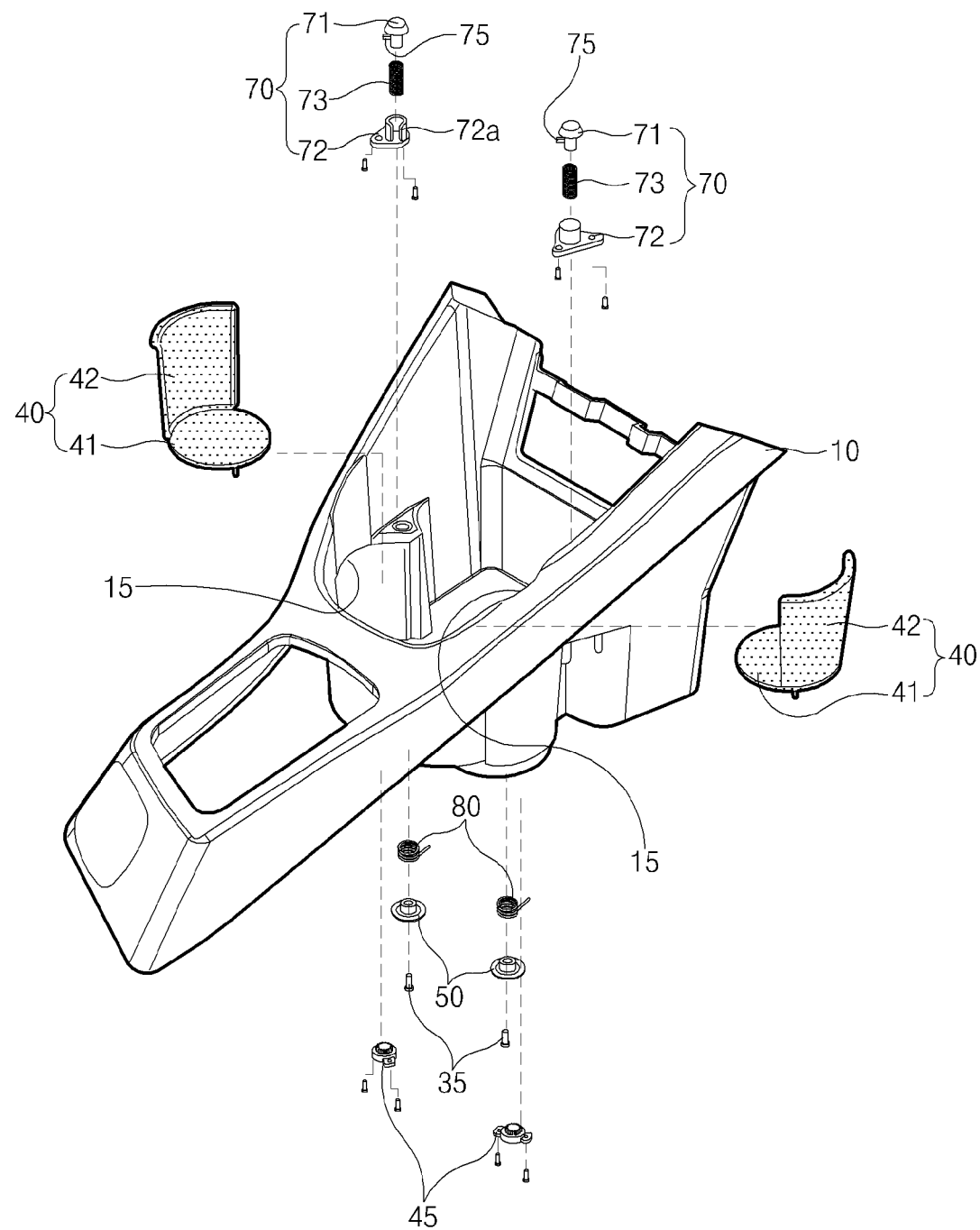
FIG. 4 is an exploded perspective view of a cup holder of FIG. 3.
Figure 5:
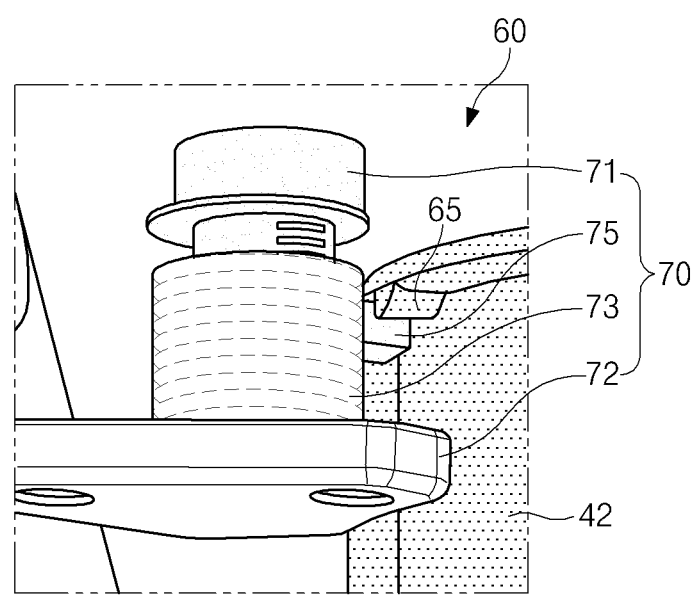
FIG. 5 is a view illustrating a state where a locking projection of FIG. 4 is lock-maintained by a hook.

First, FIG. 3 shows a state where the cup support member 40 is lock-maintained in the accommodating tray 10 to be used as the tray. In this case, the button member 70 in the state where the cup support member 40 is lock-maintained in the accommodating tray 10 is shown. AS illustrated in FIG. 5, the hook 75 of the knob 71 is hook-maintained in the locking projection 65 of the support portion 42.

Figure 6:
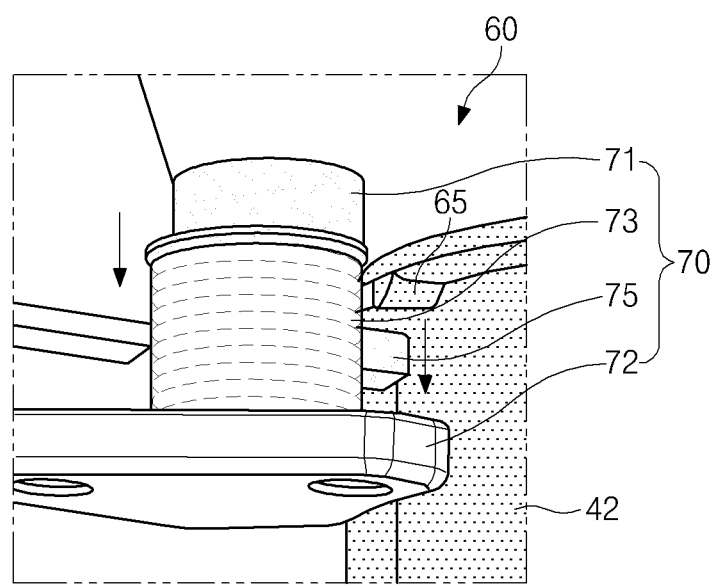
FIG. 6 is a view illustrating a state where a hook is lock-released from a locking projection through the press of a knob of FIG. 5 downward.

Thereafter, if the user presses the knob 71 in the downward direction to use the cup support member 40, as illustrated in FIG. 6, the hook 75, together with the knob 71, is moved in the downward direction to be lock-released from the locking projection 65, and thus the compression spring 73 is in a compressed state. If the hook 75 is lock-released from the locking projection 65 as described above, the cup support member 40 starts to be rotated around the rotating shaft 35 by the restoring force of the torsion spring 80, and is finally shifted to a cup supportable state as illustrated in FIG. 8.

Figure 7:
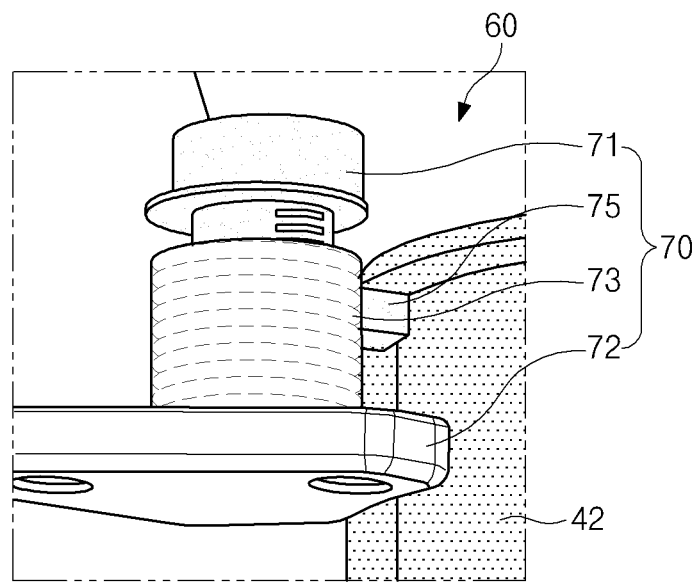
FIG. 7 is a view illustrating a state where a knob of FIG. 6 is restored in upward direction by a compression spring.

Then, if the user takes his/her hand off the knob 71, as illustrated in FIG. 7, the knob 71 ascends to be returned to its original position by the restoring force of the compression spring 73.

On the other hand, in order to return the cup support member 40 to its original position, i.e. non-use state (a state as shown in FIG. 3), the user manually rotates the cup support member 40 counterclockwise so that the locking projection 65 is lock-maintained in the hook 75.

Figure 12:
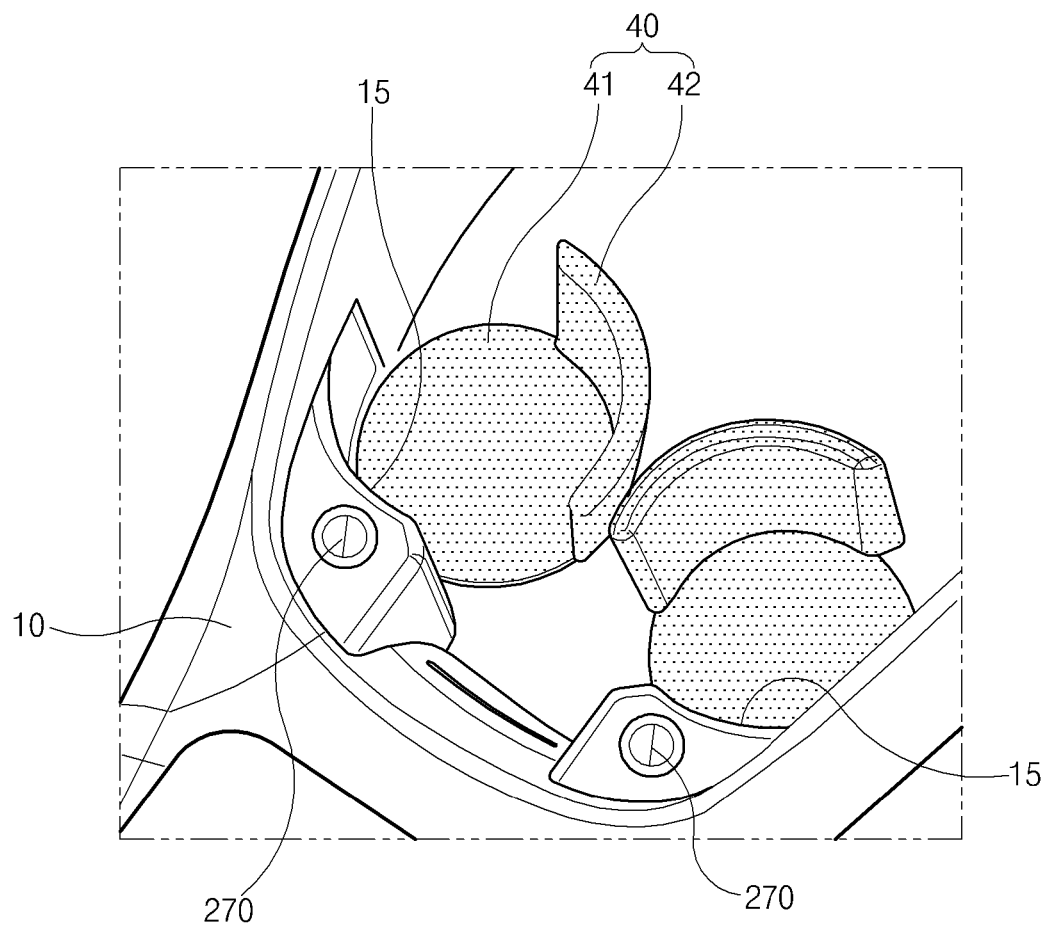
FIG. 12 is a perspective view of an exemplary cup holder according to the present invention.

FIG. 12 is a perspective view of a cup holder according to a second embodiment of the present invention. The position of the button member 270 in the second embodiment is different from the position of the button member 70 according to the first embodiment. That is, in the first embodiment, the button member 70 is positioned in front of the cup support member 40, whereas in the second embodiment, the button member 270 may be positioned in the rear of the cup support member 40.

That is, in the related art, if the button 170 is pressed, the diameter-compensating flap 105 is rotated in association with the pressed button to release the locking state of the cup support member 140, and the cup support member 140 is rotated. Accordingly, the button 170 and the diameter-compensating flap 105 should be designed in consideration of the rotating direction of the cup support member 140 to deteriorate the design degree of freedom. By contrast, according to the first and second embodiments of the present invention, the position of the button members can be freely changed regardless of the rotating direction of the cup support member 40, and thus the design degree of freedom can be improved.

As described above, according to an exemplary embodiment of the present invention, the release prevention member 50 is separately prepared and then is connected to the cup support member 40, and thus the movement of the cup support member 40 in upward, downward, right, and left directions can be maximally hindered even if the rotation amount of the cup support member 40 against the accommodating tray 10 is large.

Also, the position of the button members 70 and 270 for releasing the locking state between the cup support member 40 and the accommodating tray 10 can be changed regardless of the rotating direction of the cup support member, and thus the design degree of freedom can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cup holder apparatus for a vehicle comprising:
    an accommodating tray provided inside a vehicle compartment and having an accommodation space for accommodating a cup therein;
    a cup support member rotatably provided around a rotating shaft (Z axis) against the accommodating tray and including a bottom portion for safe-placing the cup in the accommodation space and a support portion formed in a stand from the bottom portion to support an outer periphery of the cup; and
    a release prevention member prepared separately from the cup support member and connected to the bottom portion of the cup support member, while being rotatably coupled to the accommodating tray, to prevent release of the cup support member from the accommodating tray, wherein the release of the release prevention member from the accommodating tray is hindered by an upper stopper formed on the accommodating tray while the cup support member is rotatably coupled to the upper stopper and is rotated around the rotating shaft.

2. The cup holder apparatus of claim 1, wherein the accommodating tray includes a retaining portion to which the support portion of the cup support member is selectively received.

3. The cup holder apparatus of claim 1, further comprising a left stopper and a right stopper formed in a tray main body of the accommodating tray, wherein the release prevention member is positioned between the upper stopper and the left/right stopper.

4. The cup holder apparatus of claim 3, wherein the accommodating tray comprises:
    the tray main body having a bottom surface on which the left and right stoppers are formed; and
    an upper cover which is integrally fixed to an upper portion of the tray main body and on which the upper stopper is formed.

5. The cup holder apparatus of claim 4, wherein the left and right stoppers form a recessed portion on the bottom surface of the tray main body to open an upper side of the tray main body such that the release prevention member is rotatably disposed in the recessed portion, and the upper stopper is a bottom surface of the upper cover.

6. The cup holder apparatus of claim 5, wherein the release prevention member comprises:
    a release prevention main body positioned in the recessed portion in a state where the release prevention main body is in close contact with the bottom surface of the upper cover; and
    a rotating shaft insertion main body which is formed to project upwards from the release prevention main body and into which a shaft support portion protruding from the bottom portion of the cup support member is inserted.

7. The cup holder apparatus of claim 6, wherein the outer diameter of the release prevention main body is larger than the inner diameter of the upper stopper.

8. The cup holder apparatus of claim 6, wherein the rotating shaft connects the release prevention main body and the shaft support portion by passing the release prevention main body and the shaft support portion together, and wherein the rotating shaft slidably supports the release prevention main body against the bottom surface of the tray main body.

9. The cup holder apparatus of claim 4, wherein a guide is formed to project in one direction from the bottom surface of the bottom portion along a circumferential direction thereof, and a rail, which rotatably guides the guide while the cup support member is rotated, is formed to project in the other direction from the upper surface of the upper cover.

10. The cup holder apparatus of claim 1, further comprising a locking unit including:
    a locking projection formed to project downwards from an outer circumference surface of the support portion; and
    a button member which is elastically supported to be pressed on one side of the accommodating tray and on which a hook to selectively lock the locking projection is formed thereto.

11. The cup holder apparatus of claim 10, further comprising an elastic member having one end fixed to the accommodating tray and the other end fixed to the bottom portion of the cup support member to apply an elastic force to the cup support member in a direction in which the cup support member is lock-released from the locking unit;
    wherein when a user presses the button member, the hook is lock-released from the locking projection and thus the cup support member is rotated around the rotating shaft to be shifted to a cup supportable state by the elastic force of the elastic member such that the support portion of the cup support member is released from the retaining portion of the accommodating tray to form the accommodating space for accommodating the cup therein.

12. The cup holder apparatus of claim 11,
wherein a gear is formed along a circumferential direction on the bottom surface of the bottom portion with a predetermined diameter along the rotating shaft, and
wherein a rotating damper is installed in the accommodating tray and engaged with the gear of the bottom portion while the cup support member is rotated around the rotating shaft by the elastic member.

13. The cup holder apparatus of claim 12, wherein the rotating damper includes a gear engaged with the gear of the bottom portion.

14. The cup holder apparatus of claim 13, wherein the rotating damper is an elastic member.

15. The cup holder apparatus of claim 10, wherein the button member comprises:
a knob including the hook;
a mounting bracket attached to the accommodating tray and slidably receiving the knob therein, wherein the mounting bracket includes an exposing hole formed along a longitudinal direction of the mounting bracket and the hook of the knob projects toward the locking projection of the support portion through the exposing hole; and
a compression spring installed inside the mounting bracket to elastically support the knob in an upward direction.

16. The cup holder apparatus of claim 15, wherein the button member is installed in the accommodating tray by changing the position thereof regardless of the rotating direction of the cup support member.

17. A cup holder apparatus for a vehicle, comprising:
an accommodating tray provided inside a vehicle compartment and having an accommodation space for accommodating a cup;
a cup support member rotatably provided around a rotating shaft (Z axis) against the accommodating tray and including a bottom portion for safe-placing the cup and a support portion formed in a stand from the bottom portion to support an outer periphery of the cup;
a release prevention member prepared separately from the cup support member and connected to the bottom portion of the cup support member, while being rotatably coupled to the accommodating tray, to prevent release of the cup support member from the accommodating tray;
a locking unit including a locking projection formed to project downwards from an outer circumference surface of the support portion, and a button member which is elastically supported to be pressed on one side of the accommodating tray and on which a hook to selectively lock the locking projection is formed thereto; and
an elastic member having one end fixed to the accommodating tray and the other end fixed to the bottom portion of the cup support member to apply an elastic force to the cup support member in a direction in which the cup support member is lock-released from the locking unit;
wherein the button member is installed in the accommodating tray by changing the position thereof regardless of the rotating direction of the cup support member.

18. The cup holder apparatus of claim 17, wherein the release prevention member comprises:
a release prevention main body positioned between an upper stopper formed in the accommodating tray and right and left stoppers; and
a rotating shaft insertion main body which is formed to project upward from the release prevention main body and into which the rotating shaft, having passed through the release prevention main body, is inserted.

* * * * *